Oct. 22, 1946.    E. B. WIGGINS    2,409,650
COUPLING
Filed June 15, 1943    2 Sheets-Sheet 1
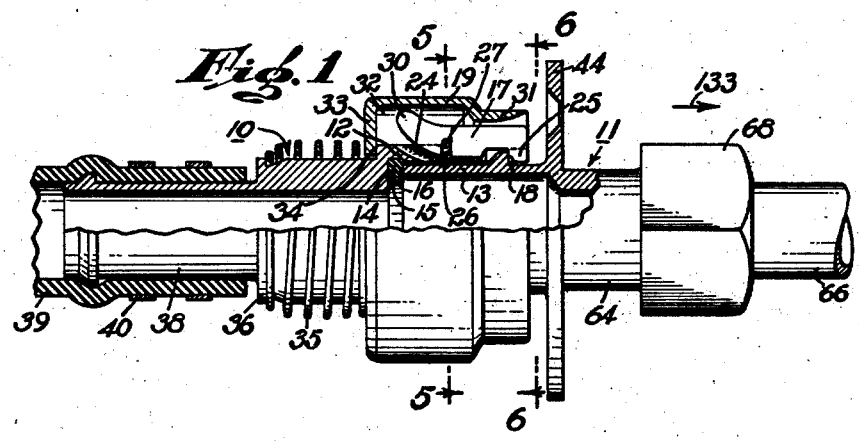
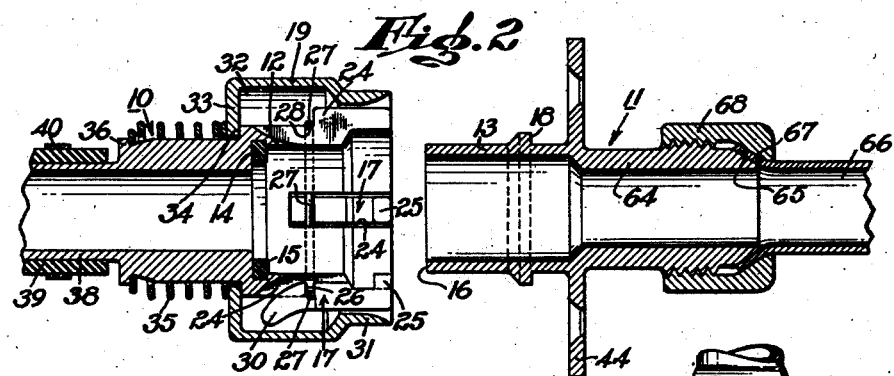
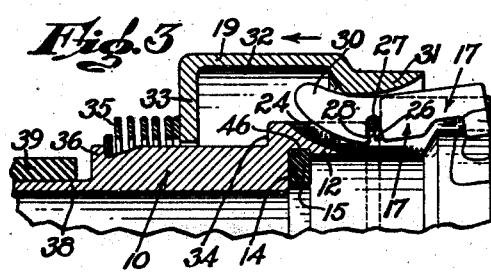
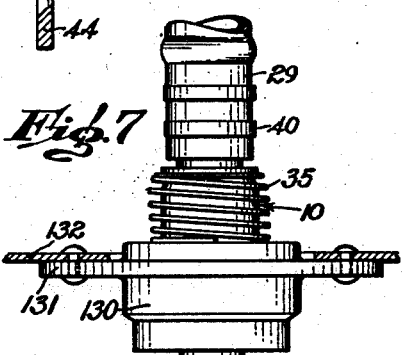
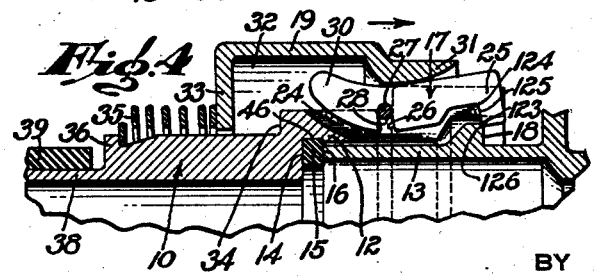
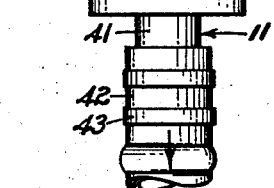
BY *Earl B. Wiggins, Deceased*
*Irene Lane Wiggins, Executrix*
*P. U. Weilein* ATTORNEY.

Oct. 22, 1946.  E. B. WIGGINS  2,409,650
COUPLING
Filed June 15, 1943  2 Sheets-Sheet 2
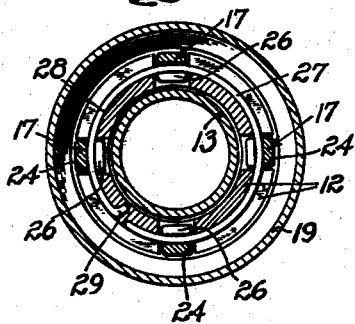
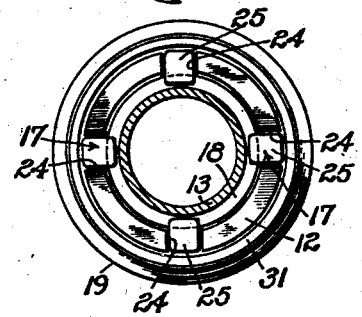
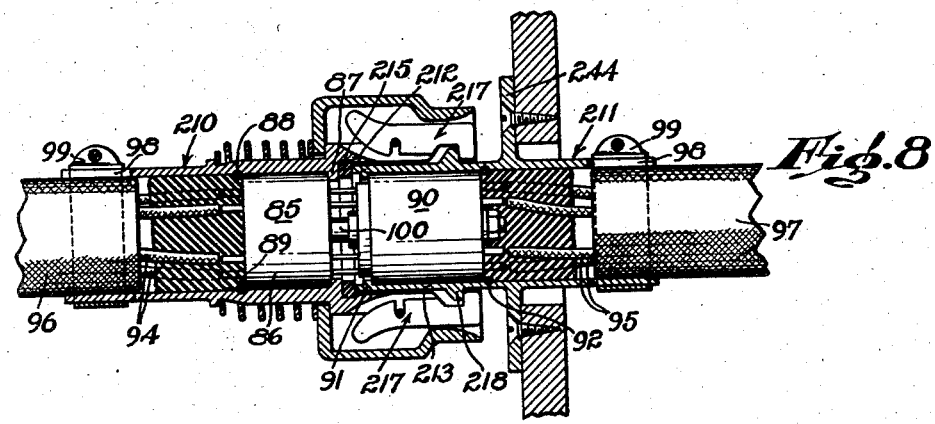
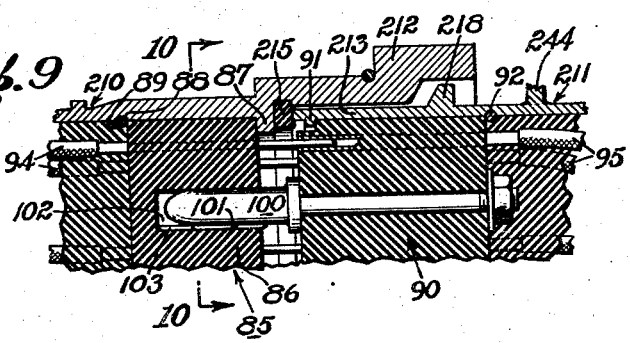
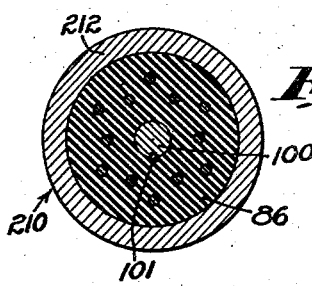
BY Earl B. Wiggins, Deceased
Irene Lane Wiggins, Executrix
ATTORNEY.

Patented Oct. 22, 1946

2,409,650

UNITED STATES PATENT OFFICE 2,409,650

COUPLING

Earl B. Wiggins, deceased, late of Los Angeles, Calif., by Irene Lane Wiggins, executrix, Los Angeles, Calif.

Application June 15, 1943, Serial No. 490,882

9 Claims. (Cl. 285—173)

This invention relates to quick acting couplings.

It is an object of this invention to provide a coupling whereby sections of conduit, or hose may be connected readily in a fluid tight manner, or disconnected without the need of relative rotary movement between the sections; such coupling being easily operable without the need of tools.

It is another object of this invention to provide in one adaptation, a coupling wherein axial forces tending to separate the joined sections have no tendency to disconnect the coupling, but in which the coupling sections may be readily disconnected when desired regardless of such axial forces.

It is another object of this invention to provide in another adaptation, a coupling wherein the joined sections are arranged to be disconnected by axial forces when such forces reach a predetermined magnitude.

It is another object of this invention to provide a quick acting coupling which is maintained locked, when coupled, against loosening or disconnecting incident to vibration.

It is still another object of this invention to provide a coupling for joining conduits in a fluid tight manner and incorporating an improved seat or gasket between the coupling sections for sealing against pressure within or without the conduit.

It is still another object of this invention to provide such a coupling incorporating a gasket, mounted in one of the coupling sections for sealing between the sections, which may be readily removed or replaced without disassembling the coupling section.

It is still another object of this invention to provide a quick acting coupling, arranged to connect electric circuits, which is easily coupled and uncoupled and which is securely held against accidental uncoupling.

It is still a further object of this invention to provide a coupling adapted to join conduits in a fluid tight manner, as well as to form electrical connections between wiring enclosed in said conduits.

It is a still further object of this invention to provide a coupling of improved and strengthened construction, and which is readily assembled.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is an elevation partly in section showing the device coupled;

Figure 2 is a sectional view illustrating the device uncoupled;

Figures 3 and 4 are fragmentary detail sections showing steps in coupling the device;

Figures 5 and 6 are cross sections taken on correspondingly numbered lines of Figure 1;

Figure 7 is an elevation of a modified form of the invention;

Figure 8 is an axial section of a further modified form of the coupling embodying an electrical connector;

Figure 9 is a transverse section on an enlarged scale of a fragment of the connector of Figure 8; and, Figure 10 is a cross section taken on line 10—10 of Figure 9.

Referring to Figures 1 and 2 of the drawings it will be seen that the coupling comprises tubular members 10 and 11 having extensions 12 and 13 respectively telescoping one within the other. The outer extension as 12 has an interior annular shoulder 14 supporting a sealing ring or gasket 15 of resilient material, for example leather or neoprene, upon which the inner end or face 16 of the other extension 13 is arranged to seat in a fluid tight manner. Means for securing or locking the members 10 and 11 in coupled relation are provided, comprising a plurality of dogs 17 mounted, comprising a plurality of dogs 17 mounted exteriorly on the extension 12 and engaging a shoulder 18 on the extension 13. An operating means comprising a ring 19 freely movable between limits on the member 10 is provided for urging the dogs 17 toward locking position, or out of locking position. The dogs 17 are so formed and supported with respect to the shoulder 18 that upon engaging the shoulder, any tendency of the members 10 and 11 to separate axially, as for example due to the resilience of the parts, has the effect of causing the dogs 17 to grip the shoulder 18 more firmly; thus these dogs may be aptly termed "self-locking" dogs. This arrangement has several important advantages. For instance, no external restraining influence such as operating ring 19 is needed to maintain the dogs locked; further, increased longitudinal strain between the members incident to the use of the coupling has no tendency to release the locking means, but instead increases the locking effect.

As clearly shown in the drawings (see also Figures 3, 4, 5 and 6) the extension 12 has a number of axially extending slots 24 formed therein for accommodating the dogs 17. Each dog 17 has a projection or tooth 25 on its forward end for engaging the shoulder 18 and is provided with an inwardly directed slot 26 intermediate its ends for accommodating a retainer or pivotal supporting means 27. As shown in Figure 5, the retainer 27 is in the form of a spring ring accommodated in a groove 28 in extension 12 and secured therein as by an inturned end 29. The rear ends 30 of the dogs 17 project outwardly.

The operating ring 19 has a forward portion 31 of reduced diameter for contacting the dogs 17, a larger rear portion 32 for freely accommodating the projecting rear portions 30 of the dogs, and a rear wall 33 engaging a stop 34 on the extension 12 which limits outward movement of the ring 19. The arrangement is such that movement of the ring 19 to the left from the shoulder 34 will cause the smaller portion 31 of the ring 19 to engage the projections 30 which swings each dog 17 to bring the tooth 25 thereon outwardly and out of engagement with the shoulder 18 (see Figure 3). Movement of the ring 19, in the opposite direction, to the right (Figure 4), will cause the portion 31 to urge the dogs 17 inwardly to bring the teeth 25 thereon into engagement with the shoulder 18.

As previously mentioned, the dogs 17 are arranged to be self-locking. This is achieved in the following manner. An inspection of Figures 3 and 4 will show that the lower or inner edge 123 of the locking surface of the tooth 25 is at a greater radial distance from the pivot 27, about which the tooth swings, than is the upper or outer edge 124. Thus, the locking surface 125 of the tooth 25 is at a progressively decreasing radial distance with respect to the pivot 27 between the points 123 and 124, and the surface 125 may therefore be correctly termed a wedge surface. The parts are so proportioned that with the resilient sealing ring or gasket 15 relaxed, and the end face 16 of the coupling section 11 in contact with said ring, the edge 123 will just engage the outer edge 126 of the shoulder 18; further inward movement of the dog 17 brings portions of the surface 125 of progressively decreasing radius against the edge 126 of the shoulder 18. This wedging action of the surface 125 urges the extension 13 inwardly of the extension 12 against the resilience of the gasket or seat 15, which is thereby slightly compressed in an axial direction.

The tendency of this ring 15 to expand urges the extension 13 outwardly of the extension 12, thus forcing the shoulder 18 tightly against the surfaces 125 on the dogs. This function of the resilient ring plays an important part in causing the dogs to be self-locking, inasmuch as the pressure between the abutting surfaces 18 and 125 creates a frictional force which resists outward displacement of the dogs with respect to the shoulder. It will be evident from an inspection of Figures 3 and 4 that the wedge angle of the surface 125, or in other words the angle formed between the surface 125 and a line drawn through point 123 and perpendicular to a radial line drawn from pivot 27 to point 123, is very small and is within the self-locking range. It is a well-known mechanical principle that a wedge is self-locking if the frictional force between the wedging surfaces exceeds the component force acting in a direction parallel to the wedging surfaces and tending to release the wedge. This condition prevails when the wedge angle is within the range between zero and an angle the tangent of which is equal to the coefficient of friction, and which is commonly referred to as the angle of friction. The range from zero to the friction angle is known as the self-locking range.

In the present instance, the wedge angle of the surface 125 is well within the self-locking range, and hence the frictional force developed between the surfaces 18 and 125 by the resilience of the ring 15 is greater than the component, acting parallel to the surfaces 18 and 125, of the force exerted by the ring. The dogs 17 are, in this manner, held in engagement with the shoulder 18 by forces developed by the resilient ring 15, and independently of the operating ring 19. The operating ring is not, therefore, subjected to any component of the axial force tending to separate the members 10 and 11. It functions solely as an actuator to move the dogs to and from their locking position.

Since the frictional force acting to retain the dogs 17 locked is but a small part of the force urging axial separation of the members 10 and 11, it follows that only a small force is required to disengage the dogs 17 from the shoulder 18, and due to the cam action between the inner surface of the reduced portion 31 on the operating ring 19 and the portions 30 of the dogs, a light force urging the ring 19 to the left as indicated by the arrow in Figure 3 is sufficient to cause disengagement of the dogs 17. An inspection of Figure 1 will show that the ring 19 may be moved a considerable distance from its normal position when it is free of the dogs 17, before engaging the dogs to cause their release. By providing this lost motion, it is possible to strike a blow on the dogs 17 with the ring 19, to assist in causing their release.

To prevent vibration displacing the ring 19 and possibly causing the dogs 17 to become disengaged a light compression spring 35 is confined between the wall 33 of the ring 19 and a shoulder 36 on the member 10 for resiliently maintaining the ring 19 in its locking or outer position with the wall 33 against the stop 34.

The member 10 has a reduced portion 38 on which is secured a flexible hose or conduit 39, as by a conventional clamp 40. A similar hose or flexible conduit may be secured to the member 11 in a like manner. However, as shown, the member 11 has an exteriorly threaded extension 64 with a tapered end face 65 for receiving a conduit 66 which may be a metallic tube or pipe. The conduit 66 has a belled end 67 for engaging the face 65 of the member 11 and is secured in fluid tight relation thereto in a well understood manner by a nut 68 threaded on the extension 64. The member 11 may also be provided with an integral mounting flange 44 if desired, whereby the coupling and associated conduits may be supported.

To couple the conduit 39 with the conduit 66, the ring 19 is retracted against the force of the spring 35 swinging the dogs 17 outwardly. The extension 12 is then slipped over the extension 13, the face 16 engaging the seat 15. The ring 19 is then moved ahead or to the right which forces the dogs 17 into locking position, as just described. When it is desired to uncouple and disconnect the members 12 and 13, the operating ring 19 is moved to the left against the force of the spring 35, which causes the dogs 17 to disengage the shoulder 18, allowing the members 12 and 13 to be separated by relative axial movement.

An important feature in preventing leakage between the members 10 and 11 is the arrangement of the resilient seal ring 15, as best shown in Figure 4. This ring 15 as previously mentioned is mounted on an annular shoulder 14, being retained thereon by means of a shallow annular recess or groove 46 in which the outer edge of the ring 15 is inserted. This is a very useful arrangement, since the resilience of the ring 15 permits it to be sufficiently deformed for easy removal or replacement when necessary; further, the ring 15 is securely held in place on the shoulder 14 without the need of detachable parts for this purpose. Hence, the coupling section 10 does not require disassembling for installation of the ring 15. This ring 15 is substantially wider than the face 16 and coaxial therewith. Thus, as the face 16 is urged against the ring 15, a central annulus of the ring is depressed so that the ring seals against both the inner and outer edges of the face 16. In this way leakage of pressure from either the outside or inside of the coupling past this face is effectively prevented.

The coupling as just described may be made self releasing by slight modifications. A coupling so arranged is illustrated in Figure 7. This coupling includes a pair of tubular members 10 and 11 arranged to be connected in the identical manner previously set forth. The member 10 is connected to a conduit 39 as before. The member 11 is slightly modified, the mounting flange 44 being omitted, and an extension 41 being provided on which is secured a conduit 42 as by clamps 43. The operating member 130 is identical in structure and function with ring 19 except that it is provided with a mounting flange 131 for supporting the coupling, as by being secured to a stationary wall 132, the coupling being supported on the member 130 by the spring 35.

When a downward force is applied to the member 11 as by a conduit 42, both the members 10 and 11 being locked together move downwardly with respect to the member 130 against the force of the spring 35. At some point in this movement the member 130 will disengage the dog 17 from the shoulder 18 on the member 11 disconnecting the members and allowing the member 11 to separate from the member 10. This action can be visualized in connection with Figure 1. Thus, assuming the ring 19 is fixed and the member 11 is pulled to the right as indicated by the arrow 133, the member 10 carrying the dogs 17 will move with it causing the ends 30 of the dogs 17 to engage the reduced portion 31 of the ring 19 and release the dogs. This is the same action as that previously described to release the dogs involving a movement of ring 19 to the left as indicated in Figure 3. It will be apparent that by appropriate choice of the part by which the coupling is restrained or supported, axial force tending to separate the coupling members may be caused to increase the locking effect of the means preventing disconnection of the members or, to effect such disconnection.

A quick acting coupling as disclosed in Figures 1 to 7 also may be used in detachably connecting electric circuits, as by mounting one element of a suitable electrical connector in one member of the coupling, and the cooperating element of the connector in the other member. Further, since this coupling is adapted to join conduits or the like in a fluid tight manner such a coupling may be used in connection with conduits or the like to effectively protect the connector from the weather or other harmful influences.

A coupling arranged in this manner is shown in Figures 8, 9 and 10. This coupling is similar to that in the other forms of the invention, comprising tubular members 210 and 211 with telescopically engaged portions 212, 213 held in coupled relationship by dogs 217 and shoulder 218 and provided with a sealing ring 215. The member 211 may be provided with an integral supporting flange 244. The male element 85 of a connector, which may be a conventional multiple pin jack, is mounted in the bore of the member 210. This element includes a cylindrical plug 86 of insulating material which may be secured on a shoulder 87 adjacent the seal ring 215 by a snap ring 88 which engages a groove 89 in the member 210. The cooperating element 90 of the connector may be similarly secured in the bore of the member 211 against a shoulder 91 by a snap ring 92. To seal the elements 85 and 90 in their respective members 210 and 211 an appropriate sealing composition indicated at 219 and 220 may be placed within the member 210 or 211 behind the element therein. The wiring connected to the connector elements 85 and 90 is indicated respectively by numerals 94 and 95. A sheath or conduit which may be provided for enclosing such wiring is indicated respectively at 96 and 97, being suitably secured respectively to the tubular members 210 and 211. For this purpose, the ends of the conduits 96 and 97 are inserted respectively in the ends of the members 210 and 211, which ends may be split as indicated at 98 for receiving the conduit. Clamping bands 99 encircling the ends of the members 210 and 211 serve to secure the conduits in the members.

To insure proper connection between the connector elements 85 and 90, means are provided for angularly positioning the elements with respect to each other. For this purpose a pin 100 carrying a key 101 is secured to the element 90 and engages an opening 102 in the member 85, this opening 102 having a slot 103 for receiving the key 101. It will be clear that with the wiring enclosed in the conduits 96 and 97, the fluid tight connection between the members 210 and 211 will effectively enclose and protect the connector elements.

What is claimed is:

1. In a quick acting coupling, a pair of cooperating members adapted to seat one within the other, means forming a shoulder on one of said members, a plurality of dogs and means mounting said dogs on the other member for movement toward and away from said shoulder, each of said dogs having a locking surface thereon engageable with said shoulder to secure the members in coupled relation, operating means movably mounted on one of said members for moving said dogs toward and away from said shoulder, one of said members having resilient means adapted to be axially deformed by means on said other member, upon movement of said member into coupled relation, said locking surfaces being disposed at a wedge angle with respect to the direction of movement thereof, said wedge angle being within the self-locking range whereby said dogs are held in locking engagement with said shoulder, and independently of said operating means, by friction induced by pressure exerted by said deformed resilient means.

2. In a quick acting coupling, a pair of cooperating members adapted to seat one within the other, means forming a shoulder on one of said members, a plurality of dogs and means mounting said dogs on the other member for movement toward and away from said shoulder, operating means movably mounted on one of said members for moving said dogs toward and away from said shoulder, each of said dogs having a locking surface thereon engageable with said shoulder to secure the members in coupled relation, one of said members having resilient means adapted to be axially deformed by means on the other member during movement of said dogs into locking engagement with said shoulder, said deformed resilient means exerting a force maintaining said shoulder in frictional engagement with the locking surfaces on said dogs, and said locking surfaces being disposed at a self-locking wedge angle with respect to the direction of movement thereof whereby said dogs are held in locking engagement with said shoulder solely by friction and independently of said operating means.

3. In a quick acting coupling, a pair of cooperating members adapted to seat one within the other, means forming a shoulder on one of said members, a plurality of dogs and means mounting said dogs on the other member for movement toward and away from said shoulder, operating means movably mounted on one of said members for moving said dogs toward and away from said shoulder, each of said dogs having a locking surface thereon engageable with said shoulder to secure the members in coupled relation, said locking surfaces being disposed at a wedge angle with respect to the direction of movement thereof toward locking position, a resilient, deformable sealing element mounted on one of said members, a sealing surface on the other member engageable with said sealing element to effect a seal between the members, and to axially deform said sealing element, the resilience of said sealing element when deformed exerting a force maintaining said shoulder in frictional engagement with said locking surfaces, and the wedge angle of said locking surfaces being within the self-locking range whereby the dogs are held in locking engagement with the shoulders solely by friction and independently of said operating means.

4. In a quick acting coupling, a pair of cooperating members adapted to seat one within the other, shoulder means on one of said members, a plurality of dogs mounted on the other member and cooperating with said shoulder means for securing the members in coupled relation, and a single element mounted on said other member and having interlocking and pivotal connection with each of said dogs, said element constituting a pivotal supporting and retaining means common to all of said dogs for supporting the dogs for pivotal movement toward and away from said shoulder means.

5. In a quick acting coupling, a pair of cooperating members adapted to seat one within the other, shoulder means on one member, a plurality of dogs mounted on the other member and cooperating with said shoulder means for securing the members in coupled relation, each of said dogs having a notch in a face thereof, said other member having a circumferential groove, and a ring seated in said groove and engaging the respective notches in said dogs for pivotally mounting said dogs on said other member for movement toward and away from said shoulder means.

6. In a quick acting coupling, a pair of cooperating members adapted to seat one within the other, one of said members having a plurality of circumferentially spaced, axially extending slots therein and a circumferential groove intersecting said slots, a ring seated in said groove and bridging said slots, a plurality of dogs, one in each of said slots, each of said dogs having a notch in a face thereof engaged by said ring for pivotally mounting said dogs on said member, and shoulder means on the other member cooperating with said dogs for securing the members in coupled relation.

7. In a quick acting coupling, a pair of tubular members adapted to be connected in fluid tight relationship, means for securing said members so connected, an operating member mounted on one of said members for axial movement with respect thereto and arranged to release said securing means in response to axial movement in one direction with respect to said one member, means on said operating member for supporting the same independently of said tubular members, said tubular members being movable in unison to cause relative movement between said one member and said operating member in securing means releasing direction, whereby the coupling is disconnected.

8. In a quick acting coupling, a pair of tubular members adapted to be connected in fluid tight relationship, means for securing said members so connected, an operating member mounted on one of said members for axial movement with respect thereto and arranged to release said securing means in response to axial movement in one direction with respect to said one member, means on said operating member for supporting the same independently of said tubular members, means resiliently suporting the coupling on said operating member, said tubular members being movable in unison to cause relative movement between said one member and said operating member in securing means releasing direction, whereby the coupling is disconnected.

9. In a quick acting coupling, a pair of tubular members adapted to be connected in fluid tight relationship, means for securing said members so connected, an operating member mounted on one of said members for axial movement with respect thereto and arranged to release said securing means in response to axial movement in one direction with respect to said one member, means on said operating member for supporting the same independently of said tubular members, means resiliently opposing movement of said one member with respect to the operating member in a direction to release the securing means, and means for moving said one member against the force of the resilient means to cause the coupling to be disconnected.

IRENE LANE WIGGINS,
*Executrix of the Last Will and Testament of Earl B. Wiggins, Deceased.*